US007027367B1

(12) United States Patent
Luffel et al.

(10) Patent No.: US 7,027,367 B1
(45) Date of Patent: Apr. 11, 2006

(54) APPARATUS FOR TRANSLATING A CARTRIDGE ACCESS DEVICE

(75) Inventors: Robert W. Luffel, Greeley, CO (US); David P. Jones, Bellvue, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/337,802

(22) Filed: Jun. 22, 1999

(51) Int. Cl.
*G11B 21/08* (2006.01)

(52) U.S. Cl. ................................... 369/30.49
(58) Field of Classification Search ........... 360/92; 369/34, 35, 36, 38, 178; 414/807, 281
See application file for complete search history.

(56) References Cited

U.S. PATENT DOCUMENTS

| 4,998,232 A | 3/1991 | Methlie et al. ............. 369/36 |
| 5,010,536 A | 4/1991 | Wanger et al. ............. 369/36 |
| 5,014,255 A | 5/1991 | Wanger et al. ............. 369/36 |
| 5,015,139 A * | 5/1991 | Baur ......................... 414/281 |
| 5,043,962 A | 8/1991 | Wanger et al. ............. 369/36 |
| 5,497,057 A | 3/1996 | Danielson et al. |
| 6,166,877 A * | 12/2000 | Tadokoro et al. ............. 360/92 |

FOREIGN PATENT DOCUMENTS

| EP | 0542482 A2 | 5/1993 |
| EP | 0685842 A2 | 12/1995 |
| EP | 0982723 A2 | 3/2000 |

* cited by examiner

*Primary Examiner*—David Davis (57) ABSTRACT

Translation apparatus for moving a cartridge access device along a displacement path may comprise a first elongate gear rack aligned along the displacement path and a second elongate gear rack positioned in spaced-apart relation to the first elongate gear rack so that the second elongate gear rack is aligned along the displacement path. A first drive pinion mounted to the cartridge access device engages the first elongate gear rack. A second drive pinion mounted to the cartridge access device engages the second elongate gear rack. A pinion drive apparatus operatively associated with the first and second drive pinions rotates the first and second drive pinions to move the cartridges access device along the first and second elongate gear racks.

18 Claims, 4 Drawing Sheets

APPARATUS FOR TRANSLATING A CARTRIDGE ACCESS DEVICE

FIELD OF INVENTION

This invention relates generally to systems for handling and storing data cartridges, such as optical disk or magnetic tape cartridges, and more specifically to positioning systems for moving cartridge access devices along arrays of data cartridges.

BACKGROUND

Many different types of data storage and handling systems exist and are being used to store data cartridges at known locations and to retrieve a desired cartridge so that data may be written to or read from the data cartridge. Such data storage and handling systems are often referred to as "juke box" data storage systems, particularly if they can accommodate a large number of individual data cartridges.

While the data cartridges may be arranged within the data storage system in any of a wide variety of configurations, many juke box data storage systems are designed so that the data cartridges are stored in one or more horizontal rows or arrays. If so, the data storage system is usually provided with a positioning apparatus for moving a cartridge access device along the array of cartridges so that the cartridge access device can access selected data cartridges stored in the array. Depending on the particular system, the cartridge access device may comprise a cartridge engaging assembly or "picker" which may be adapted to engage the selected data cartridge, withdraw it from its storage location, and carry it to a cartridge read/write device located elsewhere within the data storage system. The read/write device may then be used to read data from or write data to the cartridge. Once the read/write operation is complete, the cartridge engaging assembly or picker may withdraw the data cartridge from the read/write device and return it to the appropriate location within the cartridge storage array. In another type of system, the cartridge access device may comprise the read/write device itself, in which case the data cartridge may be read from or written to without the need to carry the data cartridge to a separate read/write device.

Regardless of the particular type of cartridge access device that is utilized by the data storage system, the positioning system used to move the cartridge access device along the cartridge storage array must be capable of moving the cartridge access device along the cartridges stored in the array so that the desired data cartridge may be accessed. One type of positioning system, often referred to as a "lead-screw" system, mounts the cartridge access device on a lead-screw which, when turned, moves the cartridge access device back and forth along the array of cartridges. While such lead-screw positioning systems are being used, they are not without their problems. For example, in such a system the cartridge access device may be cantilevered on the lead-screw which may result in excessive transverse or rotational movement of the cartridge access device. Such excessive movement reduces positional accuracy and may make it difficult for the cartridge access device to reliably engage the desired data cartridge on a repeated basis.

Partly in an effort to solved the foregoing problems, positioning systems have been developed which utilize separate guide rails or tracks to guide the cartridge access device along the array of cartridges. The cartridge access device is mounted to the separate guide rails or tacks and the lead-screw is then used only to move the cartridge access device to the desired location. Alternatively, a wire-rope (i.e., cable) drive system may be used to move the cartridge access device. While such systems generally provide for increased positional accuracy of a simple cantilevered type of lead-screw arrangement, they are still not without their disadvantages. For example, the guide rail or track assemblies usually comprise machined components finished to a high degree of precision, which adds to the overall cost of the data storage system. Moreover, the guide rail or track assemblies are often difficult to align and may become mis-aligned during subsequent shipping or movement of the data storage system. If the mis-alignment is substantial, it may be necessary to re-align and re-calibrate the positioning system before the data storage system can be placed in operation.

Consequently, a need remains for positioning system for moving a cartridge access device along an array of cartridges that provide increased positional accuracy to reduce errors due to mis-alignment of the cartridge access device. Such increased positional accuracy should be achieved with a minimum number of components to maximize reliability and reduce cost, yet not require the use of expensive, precision-machined components and guide rails. Additional advantages could be realized by reducing the amount of time required to align and calibrate the assembly during production and by reducing the likelihood of subsequent mis-alignment due to shipping or rough handling. Ideally, the positioning system should require little space, thereby allowing for a reduction in the overall size of the data storage system or allowing for an increased number of data cartridges to be stored within the system.

SUMMARY OF THE INVENTION

Translation apparatus for moving a cartridge access device along a displacement path may comprise a first elongate gear rack aligned along the displacement path and a second elongate gear rack positioned in spaced-apart relation to the first elongate gear rack so that the second elongate gear rack is aligned along the displacement path. A first drive pinion mounted to the cartridge access device engages the first elongate gear rack. A second drive pinion mounted to the cartridge access device engages the second elongate gear rack. A pinion drive apparatus operatively associated with the first and second drive pinions rotates the first and second drive pinions to move the cartridge access device along the first and second elongate gear racks.

BRIEF DESCRIPTION OF THE DRAWINGS

Illustrative and presently preferred embodiments of the invention are shown in the accompanying drawing in which.

DETAILED DESCRIPTION OF THE INVENTION

Figure 1:
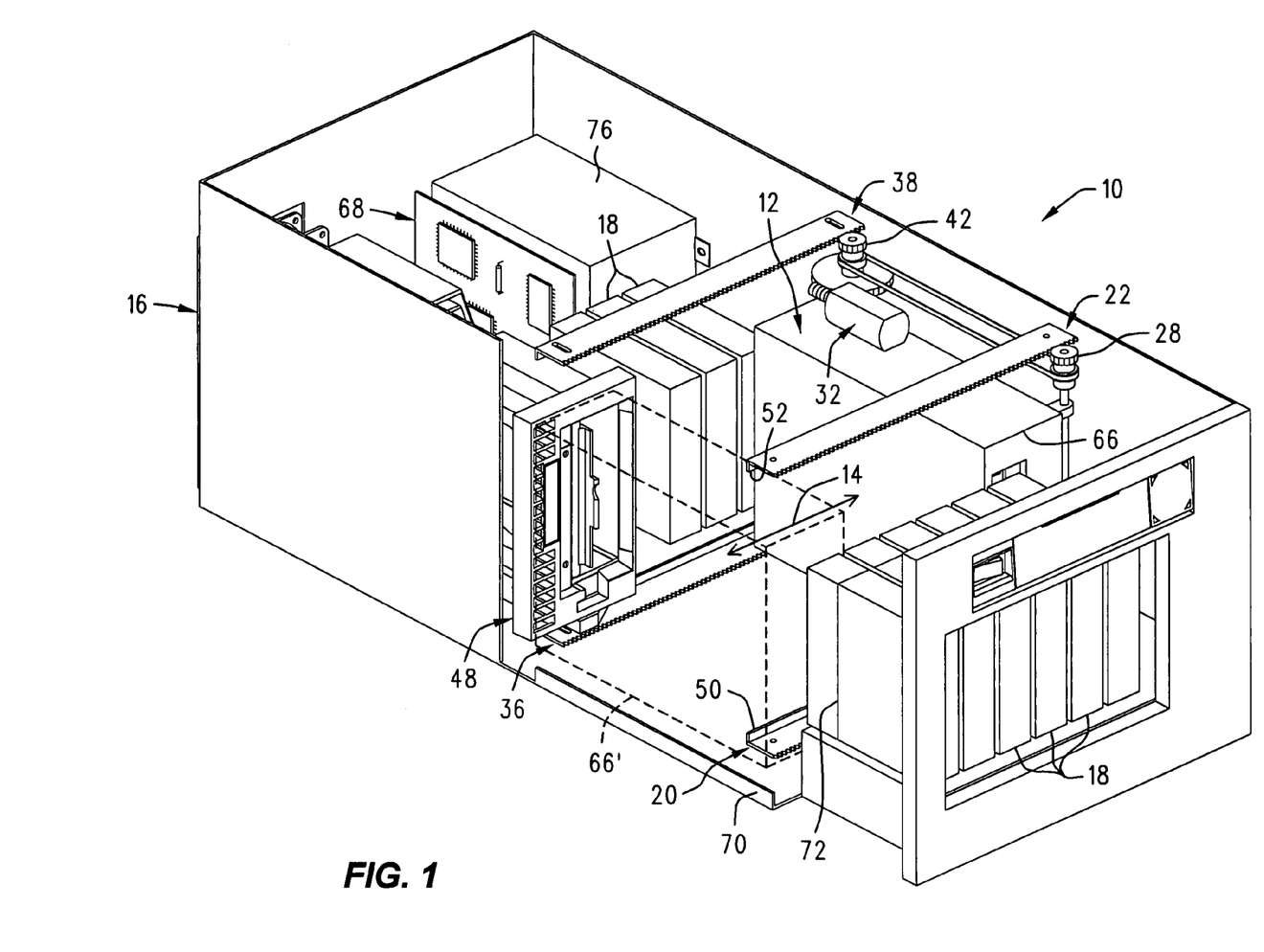
FIG. 1 is a perspective view of the translation apparatus according to one embodiment of the present invention as it may be used in a jukebox data storage system.
Figure 2:
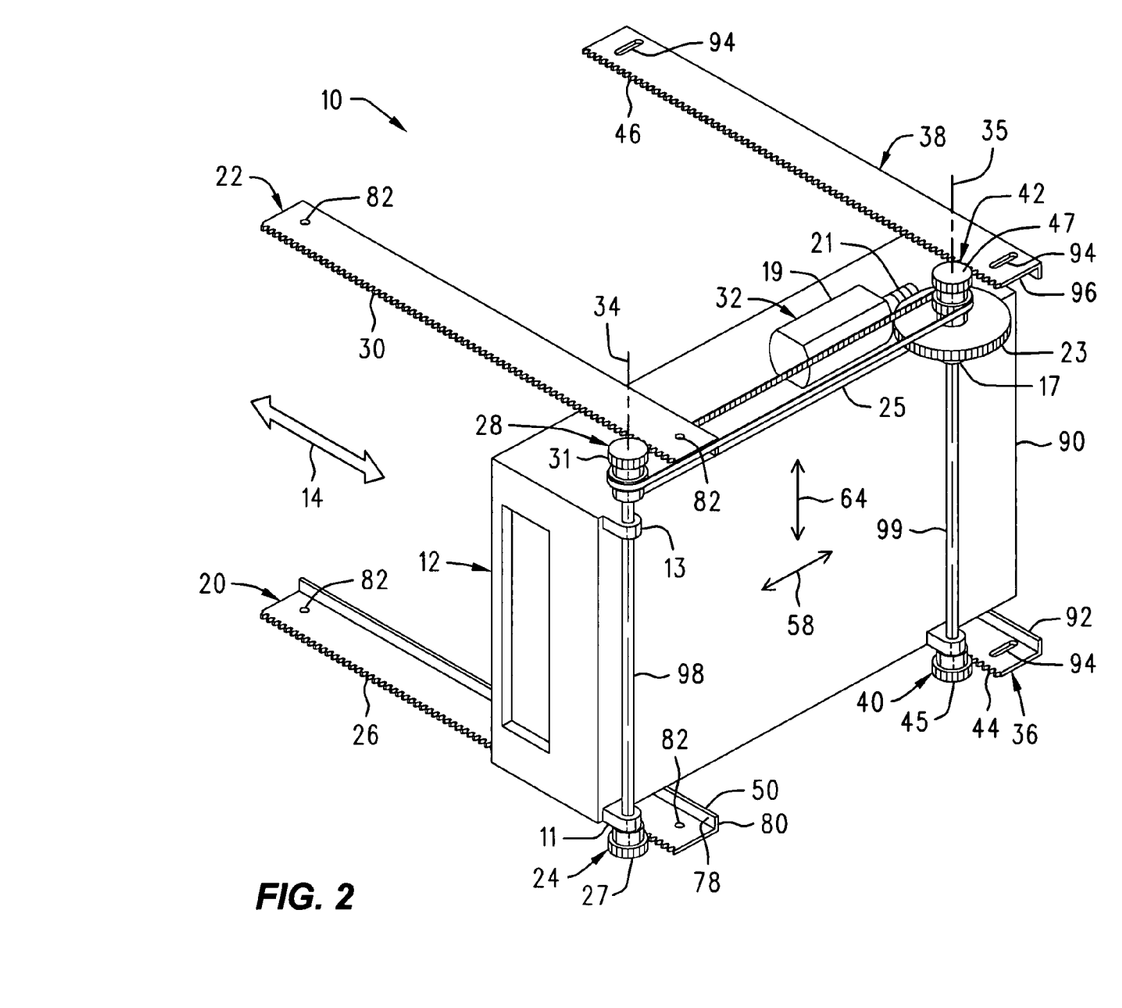
FIG. 2 is a perspective view of the translation apparatus according to the present invention.

Translation apparatus 10 for moving a cartridge access device 12 along a displacement path 14 is shown in FIG. 1 as it could be used in a "jukebox" data storage system 16 of the type commonly used to store and access data (not shown) contained on a plurality of data storage cartridges 18. In the embodiment shown and described herein, the translation apparatus 10 may comprise a first or lower elongate gear rack 20 positioned so that it is generally aligned with the displacement path 14. A second or upper elongate gear rack 22 is positioned in generally spaced-apart relation to the first or lower elongate gear rack 20 so that the second or upper elongate gear rack 22 also extends generally along the displacement path 14. A first or lower drive pinion 24 mounted to the cartridge access device 12 is sized and positioned to engage the teeth 26 provided on the first or lower gear rack 20, as best seen in FIG. 2. A second or upper drive pinion 28 may also be mounted to the cartridge access device 12 so that the second or upper drive pinion 28 engages the teeth 30 provided on the second or upper gear rack 22. A pinion drive apparatus 32 operatively associated with the lower and upper drive pinions 24 and 28 rotates the drive pinions 24 and 28 about drive pinion axis 34, thereby moving the cartridge access device 12 along the displacement path 14.

Optionally, and as will be described below, the translation apparatus 10 may be provided with third and fourth elongate gear racks 36 and 38 positioned in generally spaced-apart relation to the first and second elongate gear racks 20 and 22, in the manner best seen in FIG. 2. If such third and fourth elongate gear racks 36 and 38 are provided, the cartridge access device 12 may also be provided with third and fourth drive pinions 40 and 42 sized to engage teeth 44 and 46 provided on respective gear racks 36 and 38.

Figure 3:
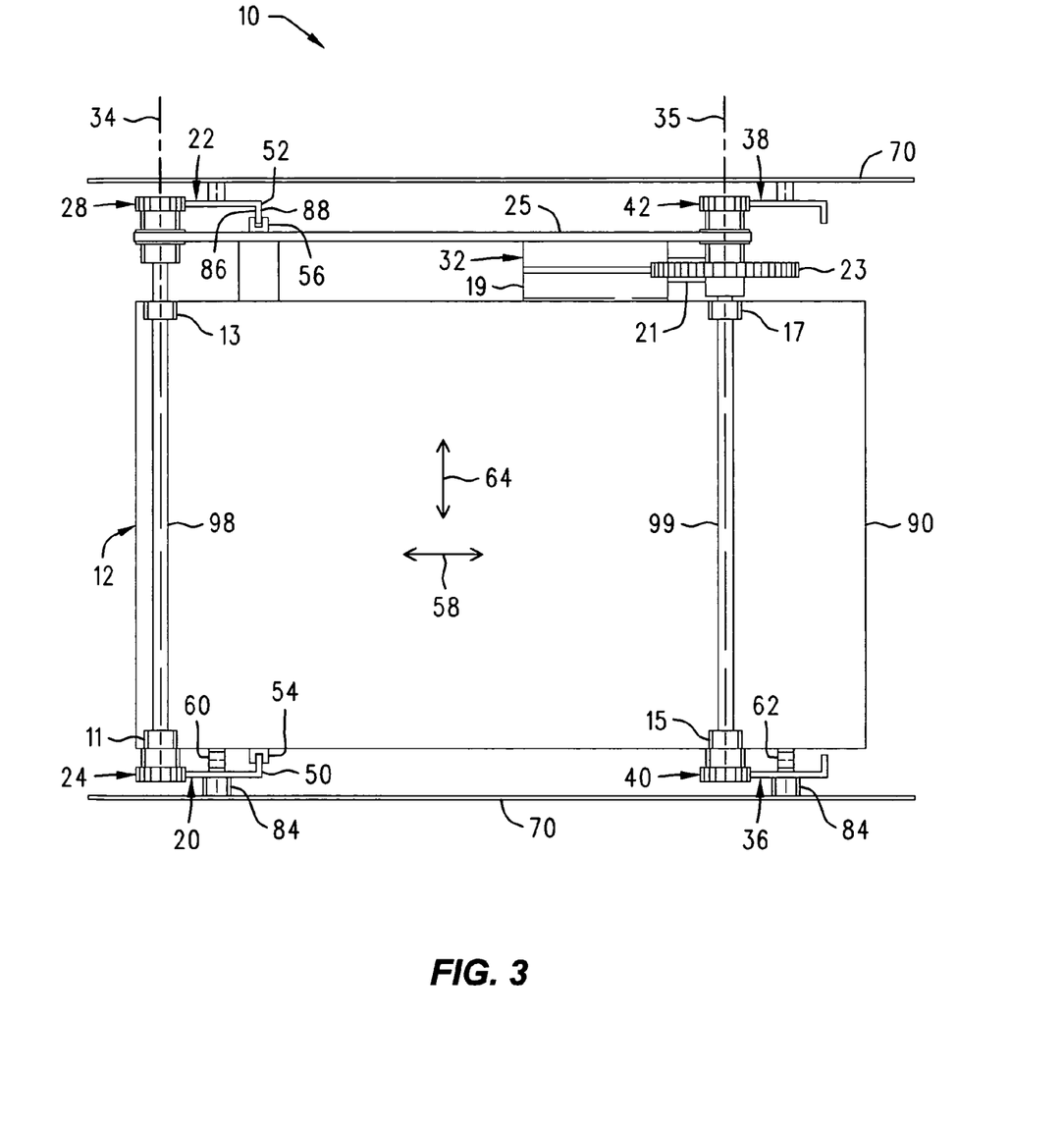
FIG. 3 is a side view in elevation of the translation apparatus.

Besides allowing the cartridge access device 12 to be moved back and forth along the displacement path 14, certain of the various elongate gear racks (e.g., 20, 22, 36, and 38) guide and support the cartridge access device 12 to allow the same to be accurately positioned adjacent the selected cartridge receiving device (e.g., a cartridge read/write device 48 or a cartridge storage array 72, as the case may be). With reference now primarily to FIG. 3, the lower and upper elongate gear racks 20 and 22 may be provided with respective elongate guide members or portions 50 and 52 that extend generally along the displacement path 14 (FIG. 2). The cartridge access device 12 may be provided with first and second bearing members 54 and 56 sized to engage the first and second guide members or portions 50 and 52, respectively. The cooperative engagement of the first and second bearing members 54 and 56 with the respective first and second guide members 50 and 52 guides or controls the position of the cartridge access device 12 in the transverse or lateral direction 58 while at the same time allowing the cartridge access device 12 to move back and forth freely along the displacement path 14.

The cartridge access device 12 may also be provided with a pair of rollers or wheels 60 and 62 which roll along the first and third elongate gear racks 20 and 36, respectively. The engagement of the rollers or wheels 60 and 62 with the first and third elongate gear racks 20 and 36 guides or controls the position of the cartridge access device 12 in the vertical direction 64.

The translation apparatus 10 may be operated as follows to move the cartridge access device 12 back and forth along the displacement path 14 to position the cartridge access device 12 adjacent the appropriate cartridge receiving device location (e.g., the cartridge read/write device 48 or the cartridge storage array 72), that may be provided in the data storage system 16. With reference now to FIGS. 1 and 2, consider, for example, a hypothetical situation wherein it is desired to move the cartridge access device 12 from an initial or first position 66 adjacent a cartridge storage location provided in the cartridge storage array 72 to a second position 66' adjacent the cartridge read/write device 46. As a first step in the process, a pinion drive apparatus control system 68 associated with the pinion drive apparatus 32 would actuate the pinion drive 32 to rotate the drive pinions (e.g., 24, 28, 40 and 42) in the appropriate directions to move the cartridge access device 12 along the displacement path 14 in the proper direction, i.e., toward the new position 66'. As it is moved or displaced, the cartridge access device 12 is guided along the displacement path 14 by the elongate guide members 50 and 52 provided on the first and second elongate gear racks 20 and 22, respectively. As discussed above, the guide members 50 and 52 control the position of the cartridge access device 12 in the transverse or lateral direction 58 (FIG. 2). The two wheels or rollers 60 and 62 control the position of the cartridge access device 12 in the vertical direction 64. Once the cartridge access device 12 reaches the second position 66' adjacent the cartridge read/write device 48, the control system 68 will deactivate the pinion drive apparatus 32, thereby stopping the motion of the cartridge access device 12.

A significant advantage of the translation apparatus 10 according to the present invention is that it provides a simple and convenient way to move the cartridge access device 12 in a lateral direction (i.e., along the displacement path 14). Since the lateral and vertical guidance is provided by the elongate gear racks (e.g., 20 and 22), they are the only components that need be carefully aligned to provide the proper alignment and positional accuracy to the cartridge access device 12. Indeed, and as will be described in greater detail below, the third and fourth elongate gear racks 36 and 38 are allowed to move or "float" in the transverse or lateral direction 58, since the lateral positioning of the cartridge access device 12 is provided by the guide member portions 50 and 52 provided on the first and second elongate gear racks 20 and 22. Allowing the third and fourth elongate gear racks 36 and 38 to move or "float" in the lateral direction 58 simplifies assembly and allows a considerable "loosening" of the positional tolerances associated with the third and fourth elongate gear racks 36 and 38. Allowing the third and fourth gear racks 36 and 38 to float in the lateral direction 58 also reduces the likelihood that the third and fourth drive pinions 40 and 42 will bind on the respective third and fourth gear racks 36 and 38 as the cartridge access device 12 is moved or translated along the displacement path 14.

Another advantage of the translation apparatus 10 is that the various elongate gear racks (e.g., 20, 22, 26, and 38) may be fabricated from sheet metal, thereby dispensing with the need to fabricate these components from more expensive materials or according to more expensive (e.g., machining) processes.

Figure 4:
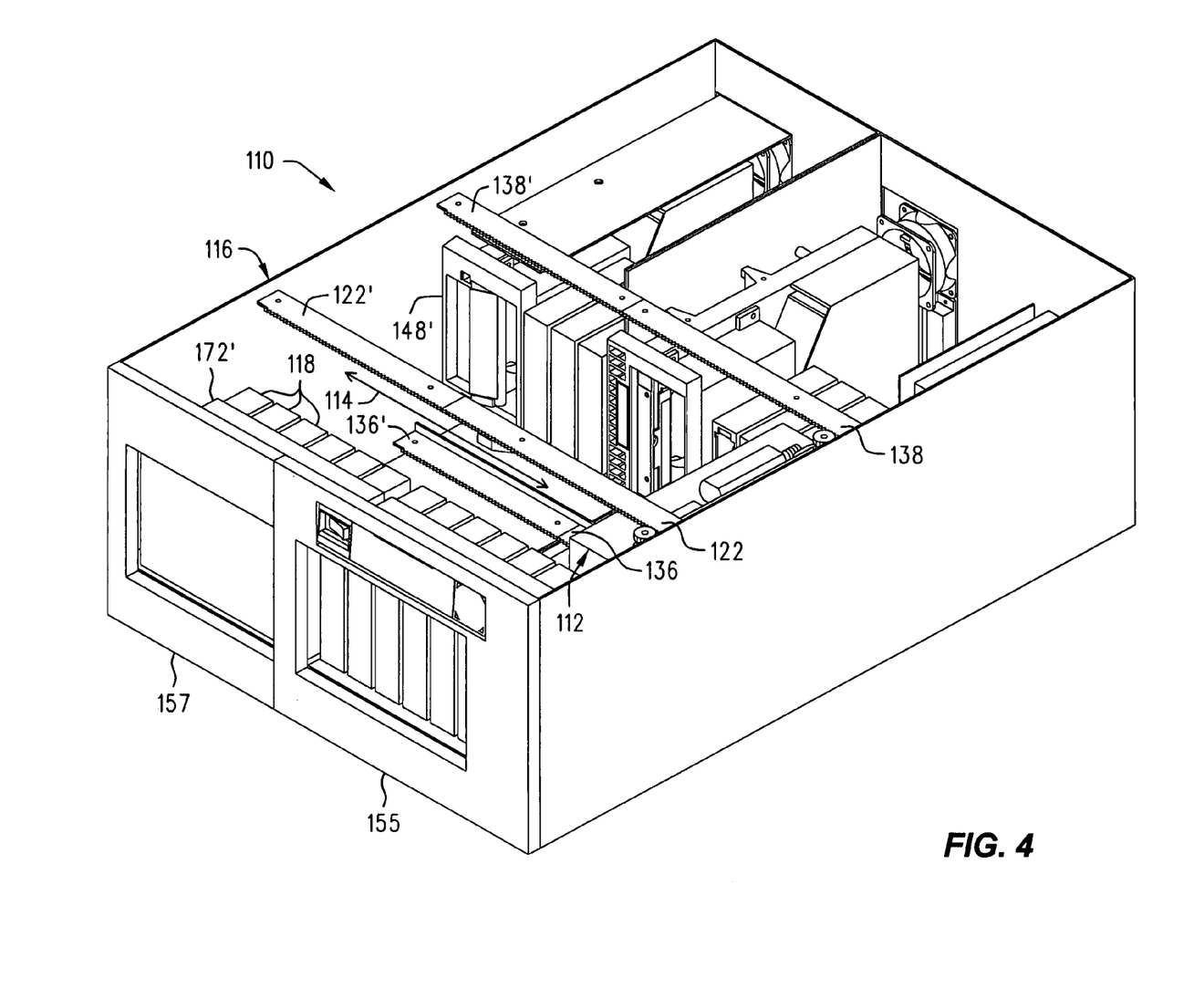
FIG. 4 is a perspective view of an expanded translation apparatus according to another embodiment of the present invention as it may be used in an expanded jukebox data storage system.

Still yet another advantage of the translation apparatus 10 is that it is readily expandable in the direction of the displacement path 14. For example, and as will be discussed in greater detail below, the displacement path 14 may be extended in length by simply positioning additional elongate gear racks adjacent the ends of the elongate gear racks 20, 22, 36, and 38, in the manner best seen in FIG. 4. Such an arrangement allows for the convenient expansion of a data storage system that embodies the translation apparatus 10 according to the present invention.

Having briefly described the translation apparatus 10 according to the present invention, as well as some of its more significant features and advantages, the various preferred embodiments of the invention will now be described in detail. However, before proceeding with the detailed description, it should be noted that while the translation apparatus 10 is shown and described herein as it could be used to move or translate a cartridge access device 12 associated with a jukebox data storage system 16, it also could be used in any of a wide range of other devices and in any of a wide range of applications wherein it is required to move objects devices between two or more defined horizontal positions. Consequently, the present invention should not be regarded as limited to the particular application shown and described herein.

With the foregoing considerations in mind, one embodiment of the translation apparatus 10 according to the present invention is shown in FIG. 1 as it could be used to move a cartridge access device 12 back and forth along a displacement path 14 contained within a jukebox data storage system 16. The jukebox data storage system 16 may comprise a housing or chassis assembly 70 for housing the various components of the translation apparatus 10, as well as a cartridge access device 12, one or more cartridge storage arrays 72, and one or more data cartridges 18. The chassis assembly 70 may also house various ancillary devices, such as one or more cartridge read/write devices 48, a power supply system 76, as well as an electronic control and data processing system (not shown) of the type commonly associated with jukebox data storage systems.

In the embodiment shown and described herein, the cartridge access device 12 may comprise a cartridge engaging assembly or "picker" (not shown) suitable for loading and retrieving the data cartridges 18 to and from the particular cartridge receiving device (e.g., the cartridge read/write device 48 or the cartridge storage arrays 72) in which the data cartridge 18 may be held. Examples of cartridge engaging assemblies or "pickers" suitable for use in the present invention are disclosed in the following U.S. patents which are specifically incorporated by reference herein for all that they disclose: U.S. Pat. No. 4,998,232 entitled "Optical Disk Handling Apparatus with Flip Latch"; U.S. Pat. No. 5,010,536 entitled "Cartridge Handling System"; U.S. Pat. No. 5,014,255 entitled "Optical Disk Cartridge Handling Apparatus with Passive Cartridge Engagement Assembly"; and U.S. Pat. No. 5,043,962 entitled "Cartridge Handling System". Alternatively, any of a wide range of other types of cartridge engaging assemblies or pickers that are now known or that may be developed in the future may be used in the present invention. In any event, since such cartridge engaging assemblies or "pickers" are well-known in the art and are not necessary in understanding the present invention, the particular cartridge engaging assembly or "picker" that is utilized in one preferred embodiment of the invention will not be described in further detail.

Regardless of the particular type of style of cartridge engaging assembly or "picker" that is utilized in the cartridge access device 12, the cartridge access device 12 may be mounted to at least two elongate gear racks 20 and 22 as follows. The first elongate gear racks 20 may comprise a lower gear rack and may be mounted to the chassis 70 so that it is generally aligned along the displacement path 14. The first or lower elongate gear rack 20 may be provided with a plurality of teeth 26 sized to operatively engage similar teeth 27 provided on the lower drive pinion 24. See FIG. 2. The first or lower elongate gear rack 20 also may be provided with an elongate guide member 50 which, in one preferred embodiment, may take the form of a turned-up edge of the elongate gear rack 20, as is also best seen in FIG. 2. Accordingly, the elongate guide member or portion 50 of the first or lower elongate gear rack 20 may comprise first and second opposed bearing surfaces 78 and 80.

The first or lower elongate gear rack 20 may be mounted to the lower portion of chassis 70 of jukebox data storage system 16 by any of a wide range of fastening systems and devices that are well-known in the art. By way of example, in one preferred embodiment, the lower elongate gear rack 20 may be mounted to the chassis 70 by one or more screws (not shown) that extend through one or more holes 82 provided in the gear rack 20. See FIG. 2. Depending on the particular installation, it may be necessary or desirable to position one or more spacers 84 (FIG. 3) between the gear rack 20 and the chassis 70 to ensure adequate clearance between the lower drive pinion 24 and the chassis 70.

The second or upper elongate gear rack 22 is similar to the first or lower gear rack 20 and may be mounted to the upper portion of chassis 70 so that it also extends along the displacement path 14. See FIG. 3. The second or upper elongate gear rack 22 may also be provided with a plurality of teeth 30 sized to engage similar teeth 31 provided on upper drive pinion 28. The upper elongate gear rack 22 may also be provided with an elongate guide member or portion 52 having opposed bearing surfaces 86 and 88, as best seen in FIG. 3. In the embodiment shown and described herein, the second elongate guide member portion 52 may comprise a down-turned edge portion of the upper gear rack 22. The upper gear rack 22 may be mounted to the upper portion of chassis 70 of the jukebox data storage system 16 by one or more screws (not shown) that extend through one or more holes 82 provided on upper gear rack 22. Alternatively, other types of fastening devices or systems may be used, as would be obvious to persons having ordinary skill in the art after having become familiar with the teachings of the present invention. If necessary to provide clearance for the upper drive pinion 28, the upper gear rack 22 may be spaced apart from the upper portion of chassis 70 by one or more spacers 84 in the manner best seen in FIG. 3.

The first or lower and second or upper elongate gear racks 20 and 22 may be fabricated from any of a wide range of materials (such as metals or plastics) suitable for the intended application. Accordingly, the present invention should not be regarded as limited to gear racks that comprise any particular material. However, by way of example, in one preferred embodiment, both the lower and upper gear racks 20 and 22 are fabricated from sheet metal with the respective guide member portions 50 and 52 thereof comprising up-turned and down-turned edge portions, respectively.

It is generally preferred, but not required, to provide the translation apparatus 10 with third and fourth elongate gear racks 36 and 38 positioned in the manner best seen in FIGS. 1 and 2. The third and fourth gear racks 36 and 38 provide improved positional accuracy along the displacement path 14 by virtue of providing additional drive surfaces (i.e., gear racks) for moving the rear end 90 of cartridge access device 16.

With reference now to FIGS. 2 and 3, the third or lower elongate gear rack 36 may be mounted to the lower portion of chassis 70 of data storage system 16 so that it also extends generally along the displacement path 14. The third elongate gear rack 36 may be provided with a plurality of gear teeth 44 sized to operatively engage teeth 45 provided on lower pinion 40. The third elongate gear rack 36 may be provided with an up-turned edge 92 to provide additional strength and rigidity to the gear rack 36, although such an up-turned edge 92 is not required.

The third elongate gear rack 36 should be mounted to the chassis 70 so that it is constrained in the vertical direction 64 as well as along the displacement path 14, but not in the transverse or lateral direction 58. Such a mounting arrangement may be accomplished by providing the third gear rack 36 with one or more elongate mounting holes or slots 94 through which a corresponding screw (not shown) or other such device may be inserted to secure the gear rack 36 to the chassis 70. The elongate mounting holes or slots 94 allow the gear rack 36 to move or "float" in the lateral direction 58, while at the same time preventing the gear rack 36 from moving in either the vertical direction 64 or horizontally along the displacement path 14. As was the case for the first two gear racks 20 and 22, it may be necessary or desirable to place a spacer 84 between the third elongate gear rack 36 and the chassis 70 to provide sufficient clearance for the third drive pinion 40.

The fourth elongate gear rack 38 may comprise a generally elongate member mounted to the upper portion of chassis 70 so that it also extends generally along the displacement path 14. The upper gear rack 38 may be provided with a plurality of gear teeth 46 sized to operatively engage teeth 47 provided on upper drive pinion 42. It is generally preferred, but not required, that the fourth elongate gear rack 38 be provided with a down-turned edge 96 to provide additional strength and rigidity to the fourth gear rack 38.

As was the case for the third elongate gear rack 36, the fourth elongate gear rack 38 should be mounted to the upper portion of chassis 70 so that it is free to move or "float" in the lateral direction 58. Such a mounting arrangement may be accomplished by providing the fourth gear rack 38 with one or more elongate mounting holes or slots 94 through which a corresponding screw (not shown) or other such device may be inserted to secure the gear rack 38 to the chassis 70. The elongate mounting holes or slots 94 allow the gear rack 38 to move or "float" in the lateral direction 58, while at the same time preventing the gear rack 38 from moving in either the vertical direction 64 or horizontally along the displacement path 14. Finally, it may be necessary or desirable to place a spacer 84 between the fourth elongate gear rack 38 and the chassis 70 to provide sufficient clearance for the fourth drive pinion 42.

The third and fourth elongate gear racks 36 and 38 may be made from any of a wide range of materials, such as metals or plastics, suitable for the intended application. By way of example, in one preferred embodiment, the third and fourth gear racks 36 and 38 are formed from sheet metal.

As was briefly described above, the cartridge access device 12 is caused to move along the displacement path 14 by the engagement of various drive pinions with the elongate gear racks. More specifically, the cartridge access device 12 may be provided with a first or lower pinion gear 24 mounted so that the teeth 27 provided thereon engage the teeth 26 provided on the first or lower gear rack 20. Similarly, a second or upper drive pinion 28 may be mounted to the cartridge access device 12 so that the teeth 31 provided on the second pinion gear 28 engage the teeth 30 provided on the upper gear rack 22. While any of a wide variety of configurations may be used to so mount the first and second drive pinions 24 and 28, in one preferred embodiment, both the lower and upper drive pinions 24 and 28 are mounted to opposite ends of a pinion shaft 98 that is journalled for rotation in a pair of bearing blocks 11 and 13 provided on the cartridge access device 12 so that the pinion shaft 98 is free to rotate about pinion axis 34.

If the translation apparatus 10 is provided with third and fourth elongate gear racks 36 and 38, then the cartridge access device 12 may be provided with third and fourth drive pinions 40 and 42 in the manner best seen in FIGS. 2 and 3. More specifically, the third or lower drive pinion 40 should be mounted to the cartridge access device 12 so that the teeth 45 provided on lower drive pinion 40 engage the teeth 44 provided on the third elongate gear rack 36. The fourth or upper drive pinion 42 may be mounted so that its teeth 47 engage the teeth 46 provided on the fourth elongate gear rack 38. In the embodiment shown and described herein, the third and fourth drive pinions 40 and 42 are mounted to opposite ends of a second pinion shaft 99 that is journalled for rotation in a pair or bearing blocks 15 and 17 provided on the cartridge access device 12 so that the second pinion shaft 99 is free to rotate about a second pinion axis 35.

The pinion drive apparatus 32 may also be mounted to the cartridge access device 12 and may comprise a motor 19 for rotating the various drive pinions 24, 28, 40, and 42 in the appropriate directions to cause the cartridge access device 12 to be moved back and forth along the displacement path 14. Any of a wide range of drive system taking on any of a wide range of configurations may be used to connect the motor 19 to the drive pinions 24, 28, 40, and 42. However, by way of example, in one preferred embodiment, the motor 19 may rotate the second pinion shaft 99 via a worm drive arrangement wherein a worm 21 mounted to the motor shaft (not shown) engages a worm gear 23 mounted to the second pinion shaft 99. The first pinion shaft 98 may be operatively connected to the second pinion shaft 99 by a toothed drive belt 25, although other devices may be used. The toothed drive belt 25 allows both pinion shafts 98 and 99 to rotate together in a synchronized manner.

The pinion drive apparatus 32 may be provided with a rotation sensing system, such as an optical encoder system (not shown), for providing the control system 68 (FIG. 1) with data indicative of the position of the cartridge access device 12 along the displacement path 14. However, since such position sensing systems are well-known in the art and could be easily provided by persons having ordinary skill in the art after having become familiar with the teachings of the present invention, the particular position sensing system utilized in one preferred embodiment of the invention will not be discussed in further detail herein.

As was briefly mentioned above, the pinion drive apparatus 32 may also comprise a control system 68 for actuating the motor 19. The control system 68 may also be responsive to position data signals produced by the position sensing system (not shown) so as to operate the motor 19 in the appropriate rotational direction and for the appropriate period of time to move the cartridge access device 12 to the desired location. However, since such control systems are well-known in the art and could be readily provided by persons having ordinary skill in the art after having become familiar with the present invention, the particular control system 68 that may be utilized in one preferred embodiment of the present invention will not be describe in further detail herein.

With reference now primarily to FIG. 3, the cartridge access device 12 is guided primarily by the first and second elongate gear racks 20 and 22. More specifically, the cartridge access device 12 may be provided with a first or lower U-shaped bearing member 54 sized to slidably engage the opposed surfaces 78 and 80 (FIG. 2) of the elongate guide member or portion 50 provided on the first elongate gear rack 20. The cartridge access device 12 may also be provided with a second or upper U-shaped bearing member 56 sized to slidably engage the opposed surfaces 86 and 88 of the elongate guide member or portion 52 provided on the upper gear rack 22. The engagement of the lower and upper U-shaped bearing members 54 and 56 with the respective guide member portions 50 and 52 restrains the cartridge access device 12 in the transverse or lateral direction 58, yet allows the cartridge access device 12 to move freely along the displacement path 14.

The U-shaped bearing members 54 and 56 may be comprise any of a wide range of materials, such as metals or plastics, suitable for providing a low friction engagement with the elongate guide members or portions 50 and 52 provided on the respective elongate gear racks 20 and 22. By way of example, in one preferred embodiment, the U-shaped bearing members 54 and 56 may be made from polycarbonate with 5% Teflon, although other materials may also be used.

It should be noted that the present invention is not limited to the sliding type bearings 54 and 56 shown and described herein, but could instead utilize roller type bearings (not shown), as would be obvious to persons having ordinary skill in the art. Such roller type bearings may comprise a plurality of rollers or wheels (not shown) positioned to engage the opposed bearing surfaces of the elongate guide members or portions 50 and 52. However, since such roller type bearings are well-known in the art and could be easily provided by persons having ordinary skill in the art after having become familiar with the teachings of the present invention, the roller type bearings that may be used in an alternative embodiment will not be discussed in further detail herein.

Still referring to FIG. 3, vertical support for the cartridge access device 12 may be provided by a pair of rollers or wheels 60 and 62 which may be mounted for rotation on the lower portion of the cartridge access device 12. More specifically, the first roller 60 may be positioned so that it rolls along the first gear rack 20. Similarly, the second roller 62 may be positioned so that it rolls along the third gear rack 36, if one is provided. Alternatively, the second roller 62 could be positioned so that it rolls directly on the lower portion of chassis 70 of the jukebox data storage system 16. In an alternative arrangement, the wheels 60 and 62 may be replaced with simple sliding bearings, as would be obvious to persons having ordinary skill in the art.

The combination of the U-shaped bearings 54, 56, and wheels 60, 62 provides full support to the cartridge access device 12 allowing it to be easily moved back and forth along the displacement path 14, while at the same time providing accurate positioning along the transverse or lateral direction 58 as well as the vertical direction 64. Since the lateral positioning is provided by the engagement of the U-shaped bearings 54 and 56 with the guide members 50 and 52 provided on the first and second gear racks 20 and 22, it is only necessary to accurately position and align the first two gear racks 20 and 22 with respect to the various cartridge receiving devices contained within the data storage system 16. Indeed, it is preferred that the third and fourth elongate gear racks 36 and 38, if provided, be allowed to float or move in the lateral direction 58 to reduce or eliminate the chances for binding to occur between the drive pinions 40 and 42 and their respective gear racks 36 and 38.

As was briefly describe above, the translation apparatus 10 may be easily expanded to provide a displacement path 14 having an increased length. For example, with reference now to FIG. 4, a second embodiment 110 of the translation apparatus may be utilized in an expanded jukebox data storage system 116. More specifically, the expanded jukebox data storage system 116 may comprise as its right half 155 the jukebox data storage system 16 shown in FIG. 1. The left half 157 may comprise an expansion module having one or more additional cartridge storage arrays 172' for storing additional data cartridges 118. The expansion module 157 may also be provided with an additional cartridge read/write device 148', although one is not required. The cartridge access device 112 may be moved back and forth along an extended displacement path 114 to allow the cartridge access device 112 to access the data cartridges 118 contained in the additional cartridge storage array 172' and the cartridge read/write device 148'.

The ability to move the cartridge access device 112 along the extended displacement path 114 may be accomplished by adding additional gear rack assemblies (e.g., 122', 136', and 138') adjacent the existing gear rack assemblies 122, 136, and 138. An additional lower gear rack (not shown) may be positioned adjacent the first or lower gear rack (e.g., 20, FIG. 1) of the right hand side module 155. Accordingly, the cartridge access device 112 may be easily moved to new positions in the expansion module 157 as the various drive pinions will continue along the additional gear racks 122', 136', and 138'.

It is contemplated that the inventive concepts herein described may be variously otherwise embodied and it is intended that the appended claims be construed to include alternative embodiments of the invention except insofar as limited by the prior art.

What is claimed is:

1. Translation apparatus for moving a cartridge access device along a displacement path, comprising:
   a first elongate gear rack aligned along the displacement path, said first elongate gear rack having a first end and a second end;
   a first elongate guide member integral with said first elongate gear rack and extending along the displacement path substantially between the first and second ends of said first elongate gear rack;
   a first bearing mounted to the cartridge access device, said first bearing engaging said first elongate guide member;
   a second elongate gear rack aligned along the displacement path and positioned in spaced-apart relation to said first elongate gear rack, said second elongate gear rack having a first end and a second end;
   a first drive pinion mounted to the cartridge access device, said first drive pinion engaging said first elongate gear rack;
   a second drive pinion mounted to the cartridge access device, said second drive pinion engaging said second elongate gear rack; and
   pinion drive apparatus operatively associated with said first and second drive pinions, said pinion drive apparatus rotating said first and second drive pinions to move the cartridge access device between the first and second ends of said first and second elongate gear racks, wherein said first elongate guide member comprises first and second opposed bearing surfaces and wherein said first bearing mounted to the cartridge access device slidably engages the first and second opposed bearing surfaces of said first elongate guide member.

2. The translation apparatus of claim 1, wherein said second elongate gear rack includes a second elongate guide member that extends along the displacement path substantially between the first and second ends of said second elongate gear rack and wherein said translation apparatus further comprises a second bearing mounted to the cartridge access device, said second bearing engaging said second elongate guide member.

3. The translation apparatus of claim 2, wherein said second elongate guide member comprises first and second opposed bearing surfaces and wherein said second bearing mounted to the cartridge access device slidably engages the first and second opposed bearing surfaces of said second elongate guide member.

4. The translation apparatus of claim 3, further comprising a third bearing mounted to the cartridge access device, said third bearing contacting said first elongate gear rack and allowing the cartridge access device to move along the displacement path.

5. The translation apparatus of claim 4, wherein said third bearing comprises a wheel.

6. Translation apparatus for moving a cartridge access device along a displacement path, comprising:
   a first elongate gear rack aligned along the displacement path, said first elongate gear rack having a first end and a second end;
   a second elongate gear rack aligned along the displacement path and positioned in spaced-apart relation to said first elongate gear rack, said second elongate gear rack having a first end and a second end;
   a third elongate gear rack positioned in generally parallel, spaced-apart relation to said first elongate gear rack;
   a fourth elongate gear rack positioned in generally parallel, spaced-apart relation to said second elongate gear rack so that said first, second, third, and fourth elongate gear racks define a generally rectangular, parallelopiped configuration with said first and third elongate gear racks defining a bottom side of the generally rectangular, parallelopiped configuration and said second and fourth elongate gear racks defining a top side of the generally rectangular, parallelopiped configuration;
   a first drive pinion mounted to the cartridge access device, said first drive pinion engaging said first elongate gear rack;
   a second drive pinion mounted to the cartridge access device, said second drive pinion engaging said second elongate gear rack; and
   pinion drive apparatus operatively associated with said first and second drive pinions, said pinion drive apparatus rotating said first and second drive pinions to move the cartridge access device between the first and second ends of said first and second elongate gear racks.

7. The translation apparatus of claim 6, further comprising:
   a third drive pinion mounted to the cartridge access device and operatively associated with said pinion drive apparatus, said third drive pinion engaging said third elongate gear rack; and
   a fourth drive pinion mounted to the cartridge access device and operatively associated with said pinion drive apparatus, said fourth drive pinion engaging said fourth elongate gear rack.

8. The translation apparatus of claim 1, wherein said pinion drive apparatus comprises:
   a motor having a shaft;
   a worm attached to the shaft of said motor; and
   a worm gear operatively connected to said first and second drive pinions, said worm gear mounted to engage said worm mounted to the shaft of said motor.

9. The translation apparatus of claim 7, further comprising:
   a fifth elongate gear rack having a first end and a second end, the first end of said fifth elongate gear rack being mounted adjacent the second end of said first elongate gear rack so that said fifth elongate gear rack is aligned along the displacement path; and
   a sixth elongate gear rack having a first end and a second end, the first end of said sixth elongate gear rack being mounted adjacent the second end of said second elongate gear rack so that said sixth elongate gear rack is aligned along the displacement path.

10. The translation apparatus of claim 9, further comprising:
    a seventh elongate gear rack having a first end and a second end, the first end of said seventh elongate gear rack being mounted adjacent the second end of said third elongate gear rack so that said seventh elongate gear rack is aligned along the displacement path; and
    an eighth elongate gear rack having a first end and a second end, the first end of said eighth elongate gear rack being mounted adjacent the second end of said fourth elongate gear rack so that said eighth elongate gear rack is aligned along the displacement path.

11. Translation apparatus for moving a cartridge access device along a displacement path, comprising:
    a first elongate gear rack aligned along said displacement path, said first elongate gear rack having a first end and a second end;
    a second elongate gear rack aligned along said displacement path and positioned in spaced-apart relation to said first elongate gear rack;
    a first elongate guide member integral with said first elongate gear rack so that said first elongate guide member extends along the displacement path;
    a second elongate guide member extending along the displacement path and positioned in spaced-apart relation to said first elongate guide member;
    a first drive pinion mounted to the cartridge access device, said first drive pinion engaging said first elongate gear rack;
    a second drive pinion mounted to the cartridge access device, said second drive pinion engaging said second elongate gear rack;
    a first bearing mounted to the cartridge access device, said first bearing engaging said first elongate guide member;
    a second bearing mounted to the cartridge access device, said second bearing engaging said second elongate guide member;
    pinion drive apparatus operatively associated with said first and second drive pinions, said pinion drive apparatus rotating said first and second drive pinions to move the cartridge access device along the displacement path, wherein said first elongate guide member comprises first and second opposed bearing surfaces and wherein said first bearing mounted to the cartridge access device slidably engages the first and second opposed bearing surfaces of said first elongate guide member.

12. The translation apparatus of claim 11, wherein said second elongate guide member comprises first and second opposed bearing surfaces and wherein said second bearing mounted to the cartridge access device slidably engages the first and second opposed bearing surfaces of said second elongate guide member.

13. The translation apparatus of claim 12, further comprising a third bearing mounted to the cartridge access device, said third bearing contacting said first elongate gear rack and allowing the cartridge access device to move along the displacement path.

14. The translation apparatus of claim 13, wherein said third bearing comprises a wheel.

15. The translation apparatus of claim 13, further comprising:
   a third elongate gear rack positioned in generally parallel, spaced-apart relation to said first elongate gear rack; and
   a fourth elongate gear rack positioned in generally parallel, spaced-apart relation to said second elongate gear rack so that said first, second, third, and fourth elongate gear racks define a generally rectangular, parallelopiped configuration with said first and third elongate gear racks defining a bottom side of the generally rectangular, parallelopiped configuration and said second and fourth elongate gear racks defining a top side of the generally rectangular, parallelopiped configuration.

16. The translation apparatus of claim 15, further comprising:
   a third drive pinion mounted to the cartridge access device and operatively associated with said pinion drive apparatus, said third drive pinion engaging said third elongate gear rack; and
   a fourth drive pinion mounted to the cartridge access device and operatively associated with said pinion drive apparatus, said fourth drive pinion engaging said fourth elongate gear rack.

17. The translation apparatus of claim 16, further comprising:
   a fifth elongate gear rack having a first end and a second end, the first end of said fifth elongate gear rack being mounted adjacent the second end of said first elongate gear rack so that said fifth elongate gear rack is aligned along the displacement path; and
   a sixth elongate gear rack having a first end and a second end, the first end of said sixth elongate gear rack being mounted adjacent the second end of said second elongate gear rack so that said sixth elongate gear rack is aligned along the displacement path.

18. The translation apparatus of claim 17, further comprising:
   a seventh elongate gear rack having a first end and a second end, the first end of said seventh elongate gear rack being mounted adjacent the second end of said third elongate gear rack so that said seventh elongate gear rack is aligned along the displacement path; and
   an eighth elongate gear rack having a first end and a second end, the first end of said eighth elongate gear rack being mounted adjacent the second end of said fourth elongate gear rack so that said eighth elongate gear rack is aligned along the displacement path.

* * * * *